Patented Jan. 29, 1946

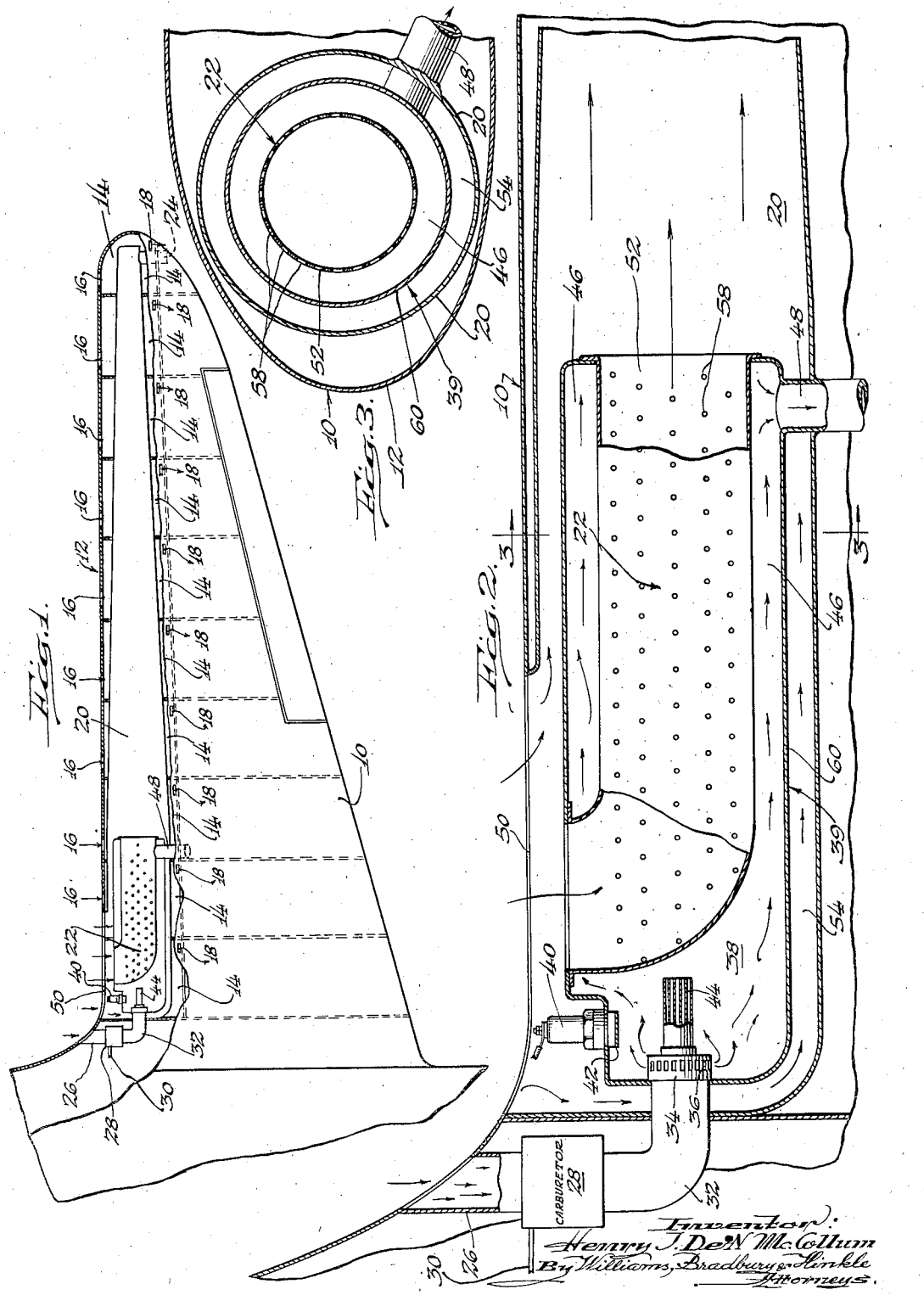

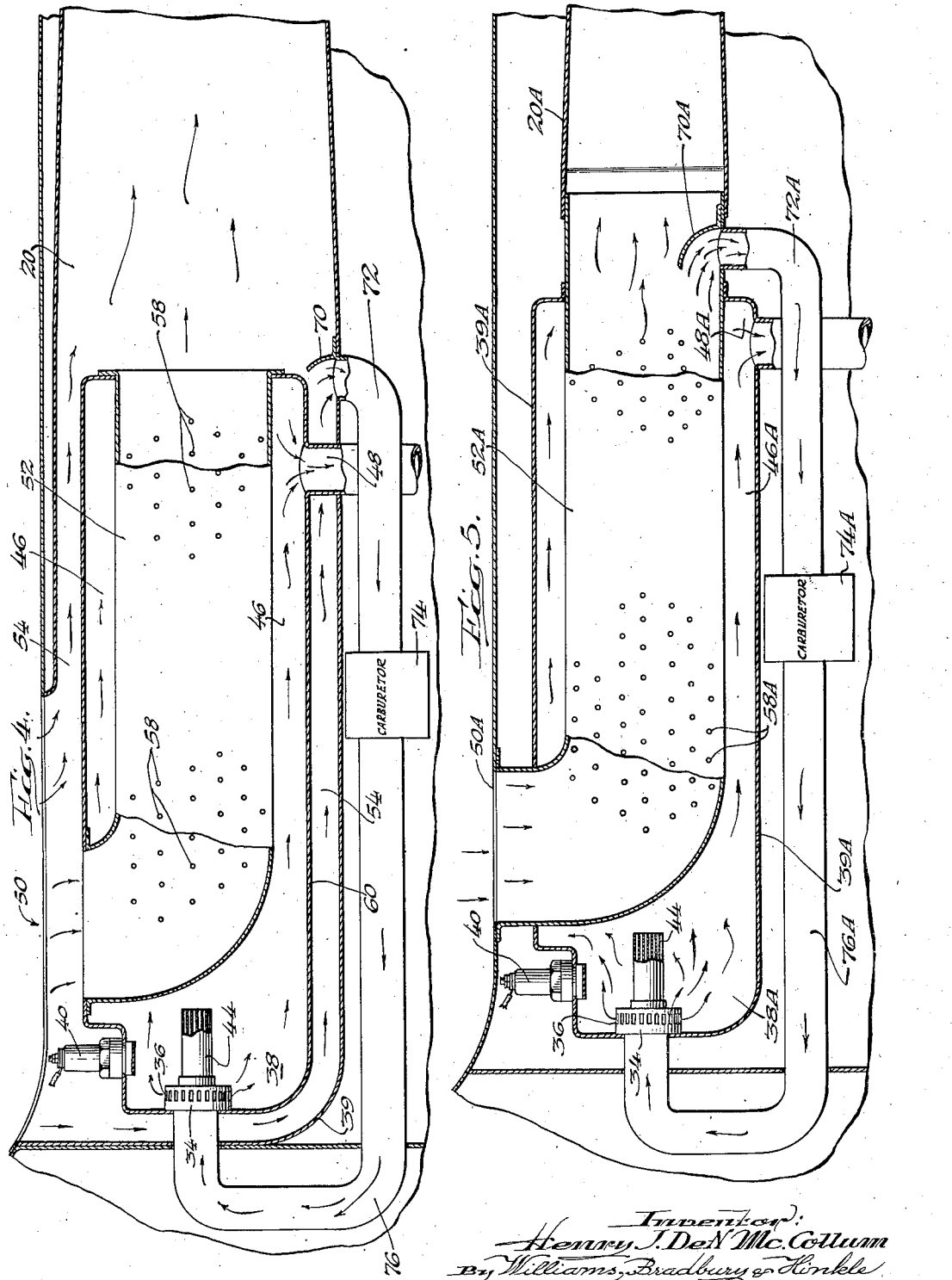

2,393,792

UNITED STATES PATENT OFFICE 2,393,792

HEATING APPARATUS

Henry J. De N. McCollum, Chicago, Ill.; Thelma McCollum executrix of said Henry J. De N. McCollum, deceased Application August 28, 1942, Serial No. 456,486

8 Claims. (Cl. 126—110)

My invention relates to heating apparatus and is more particularly concerned with heating apparatus of the internal combustion type adapted for use in aircraft.

An object of my invention is to provide a new and improved, light-weight heating apparatus which is particularly adapted for use in aircraft.

Another object of my invention is to provide heating apparatus of the internal combustion type which is more efficient than the heating apparatus heretofore used.

Another object of my invention is to provide new and improved heating apparatus which is light in weight, efficient, and which will give long and trouble-free use under severe operating conditions.

Another object of my invention is to provide new and improved heating apparatus which is particularly adapted for heating the leading edge of an airplane wing to prevent the accumulation of ice and snow thereon.

Another object of my invention is to provide a new and improved heater which because of its superior efficiency and lightness in weight is particularly adapted for use on aircraft but is capable of being used in other applications.

Another object of my invention is to provide heating apparatus of the internal combustion type provided with new and improved means for diluting unburned gases to prevent explosion of these gases.

Another object of my invention is to provide a heater of the internal combustion type having new and improved means for insuring complete and efficient combustion of all of the fuel supplied thereto.

Another object of my invention is to provide a heater of the internal combustion type having new and improved means for preventing stratification of the burned gases in the heat transfer means.

Other objects and advantages will become apparent as the description proceeds.

In the drawings:

Fig. 1 is a somewhat diagrammatic view of an airplane wing having my new and improved heating apparatus applied thereto. Parts of the wing and heating apparatus are cut away to show various constructional features more clearly;

Fig. 2 is a view similar to Fig. 1, but shows only a portion of the subject matter of Fig. 1 and this portion on an enlarged scale;

Fig. 3 is a partial, transverse, sectional view taken on the line 3—3 of Fig. 2;

Fig. 4 is a view similar to Fig. 2 but showing a modified form of my invention; and Fig. 5 is a view similar to Fig. 2 but showing a further modification of my invention.

In Fig. 1, I have illustrated one embodiment of my new and improved heating apparatus as being applied to an airplane having a wing 10 with a leading edge 12. In this figure my new and improved heating apparatus is utilized to prevent the accumulation of ice or snow on the leading edge of the wing or to heat this edge sufficiently to melt any snow or ice which may have accumulated thereon prior to the initiation of heater operation. While this is a particularly advantageous use of my invention, my invention is not limited to this use but may be utilized to heat the cabin or any other enclosed space of the airplane or to heat the passenger compartment of any automotive vehicle or for other general purposes.

That part of the wing 10 adjacent the leading edge is illustrated as being provided with a plurality of compartments 14. Each of these compartments has an air inlet or ram 16 located in the leading edge 12 and at one end of its compartment 14. Each compartment is also provided with an air outlet 18 which may communicate directly with atmosphere or with the interior of the wing 10 and thence to atmosphere through an appropriate slot or other opening as desired. The outlets 18 are at opposite sides and ends of the compartments from the inlets 16 so that air entering a compartment 14 flows around heating pipe 20 which extends through all compartments. The incoming air is heated by pipe 20 and gives up its heat to the leading edge 12 before passing out of compartment outlet 18. The particular arrangement of compartments shown in Fig. 1 is described and claimed in my prior application Serial No. 446,813, filed June 12, 1942, and is shown herein merely to indicate a type of installation for which my novel heating apparatus is particularly adapted.

An internal combustion heater indicated generally by reference numeral 22 supplies hot heating air to the inlet or left-hand end of the pipe 20. This heating air flows lengthwise of the pipe through the several compartments 14 and gives up its heat to the air entering these compartments through the inlets 16. The heating air is eventually discharged from the pipe 20 through outlet 24 which may communicate directly with atmosphere or may communicate with atmosphere through the wing structure 10.

The heater or heating apparatus indicated by reference numeral 22 has a ram 26 through which air is forced to a carburetor 28 supplied with fuel through a pipe 30 which may be connected to one of the main fuel tanks of the airplane or to a special tank provided only for the heater 22. The combustible mixture formed by the carburetor 28 flows through pipe 32 to burner tube 34. The burner tube 34 has circumferentially arranged outlets 36 designed to give the combustible mixture a whirling motion as it enters the combustion chamber 38 located in the left-hand end of a tubular furnace 39.

The combustible mixture entering the combustion chamber 38 is ignited by an electrical igniter 40 which may be supplied with current from a special battery or generator or may be connected with the electrical system of the airplane. The igniter 40 is of the hot wire type and the combustion chamber end of this igniter is guarded by a semi-circular shield 42 which prevents the cold mixture from cooling the hot wire of the igniter below ignition temperature. In internal combustion heaters of this type, it is usual to provide a thermostatic control for disconnecting the igniter from its source of current after the combustion chamber reaches normal operating temperature and thereafter to rely upon a reigniter to maintain combustion of the mixture supplied from the burner carburetor. Such a reigniter is indicated at 44 and may be of any usual or suitable type.

The hot gases flow from the combustion chamber through an elongated, annular gas passage 46 and are exhausted through an outlet 48 leading to atmosphere after the heat of these gases has been utilized to raise the temperature of the heating air supplied to pipe 20. This outlet 48 may be so arranged that suction is created therein by the operation of the airplane but ordinarily such an arrangement is unnecessary, since the ram 26 will usually provide all of the force necessary to create the desired flow of combustible mixture into the combustion chamber and of burned gases therefrom. Where it is impracticable to have the heater outlet 48 communicate directly with atmosphere, such communication can be effected through a suitable exhaust pipe.

The heater 22 is utilized to raise the temperature of heating air admitted through a ram 50 so located that atmospheric air is forced thereinto by operation of the airplane. The air entering the ram 50 strikes directly against the top of the combustion chamber as viewed in Figs. 1 and 2, and divides into two streams. One air stream flows through the tube 52, which is located in furnace 39, and forms the inner wall of gas passage 46. The other stream flows through air passage 54, which surrounds the combustion chamber and gas passage 46. Both tube 52 and air passage 54 supply heated air to heating pipe 20.

It will be noted that the combustion chamber 36 is completely surrounded by the incoming air, and this feature prevents the combustion chamber and igniter 40 from reaching unduly high temperatures, and also results in the transfer of large quantities of heat from the combustion chamber to this incoming air.

The long annular gas passage 46 has one air stream completely surrounding it and a second air stream passing through its center. The gas passage 46 thus provides a maximum amount of surface for transfer of heat from the burned gases to the incoming air and this feature materially contributes to the efficiency of my invention. These features also contribute to the reduction in weight, since the increase in efficiency of the heat transfer means makes is possible to reduce the size of the heater and the weight of material contained therein.

The wall of the tube 52 is provided with a plurality of small openings 58. The ram 50 is so proportioned and arranged relative to ram 26 and exhaust outlet 48 that the air flowing through the tube 52 is at a higher pressure than the burned gases in the gas passage 46. The air in the central stream, therefore, flows in small amounts through the openings 58 into the gas passage 46, as indicated by the arrows in Fig. 2. The openings or perforations 58 are of small diameter, for example, one-sixteenth of an inch in diameter, and air flowing into the gas passage 46 through these openings provides additional oxygen to complete the combustion of any fuel which was not burned in the combustion chamber.

The inflow of air into the gas passage 46 through these openings 58 also creates currents in the burned gases flowing therethrough and these currents prevent stratification of the gases and thus avoid the loss in heat transfer efficiency which would result from such stratification. In case the igniter 40 fails to ignite the combustible mixture delivered to the combustion chamber, the flow of air through openings 58 into this combustible mixture, as it travels through the gas passage 46, will be sufficient to dilute this combustible mixture so that it becomes non-explosive and non-combustible. This feature of my invention is of great importance in that it prevents the explosion of unburned gases in gas passage 46 and also prevents the discharge of a combustible mixture through exhaust outlet 48.

Since my new and improved heater is fully protected against any explosions of large quantities of unburned gases therein and against the relatively great forces created by such explosions, my novel heater may be made of very thin stainless steel sheets or of any other suitable light material which is capable of standing up under normal heater operation. The heat passing from the burned gases to the air to be heated, flows through very thin walls separating the air and gases. Because of this short metallic path for the heat, it is not essential that my heater be made of extremely high heat conducting material such, for example, as copper, and because of this feature my improved heater may be made of materials which are less expensive and more readily available than copper and other metals which afford extremely high heat conductivity.

When the airplane is operating and the heater controls are shifted to the on position, air entering the ram 26 mixes with fuel in the carburetor 28 to form a combustible mixture which flows through pipe 32 to burner tube 34. This combustible mixture is discharged into the combustion chamber 38 with a whirling motion and is there ignited by the electrical igniter 40. The air flowing into the ram 50 passes on both sides of the combustion chamber 36 and absorbs heat therefrom. This prevents the combustion chamber from reaching too high a temperature while materially increasing the temperature of the inflowing air.

The burned gases from the combustion chamber flow through the long annular gas passage 46 and are discharged to atmosphere through outlet 48. Part of the air entering the ram 50 flows through the outer passage 54 which surrounds the gas passage 46 and this air absorbs additional heat from the outer wall 60 of this passage. This air then passes into pipe 20. Other air entering the ram 50 flows through the central tube 52 and absorbs heat from the wall of this tube. A small proportion of this air passes through perforations 58 into gas passage 46 where it mixes with the gases therein and supplies any oxygen needed to complete the combustion of any unburned fuel in these gases. The inflowing air also causes currents which break up any stratification of these gases and increase the efficiency of heat transmission from the burned gases to the walls of passage 46. These walls in turn give up this heat to the air flowing therealong. All of the air which completely transverses the inner air passage 52 flows into the pipe 20.

The heated air supplied to the pipe 20 by the heater 22 flows lengthwise of this pipe and is discharged through outlet 42. Before being thus discharged, this air has given up its heat to the walls of pipe 20 and to circulating air admitted to the compartments 14 through ram inlets 16. This circulating air comes in intimate contact with the exterior of the pipe 20 and is heated thereby. This circulating air then gives up its heat to the leading edge 12 of the wing so that this leading edge is raised to a temperature which is sufficiently high to prevent the accumulation of ice and snow thereon and to melt any ice and snow which may have accumulated thereon before the heater operation was initiated.

After the heater has been in operation for a relatively short time, the usual thermostatic switch cuts out the igniter 40. By this time, reigniter 44 has reached a sufficiently high temperature to maintain combustion of the mixture admitted to the combustion chamber 36 through the burner tube 34 so that the heater continues to operate in the same manner. If, for any reason, the mixture admitted to the combustion chamber 36 should fail to ignite, the air flowing through perforations 58 into radiator 46 will dilute this mixture to such an extent that it is non-explosive and non-combustible.

In Fig. 1, I have illustrated my novel heating apparatus 22 as supplying heated air to a pipe 20 extending lengthwise of a compartmented wing and serving to heat the leading edge of the wing through the medium of circulating air admitted to the several compartments through the inlets 16. While such an arrangement is a desirable and effective way of conducting the heat to the leading edge of the wing, various other arrangements may be utilized to transmit to the leading edge of the wing the heat created by my novel heating apparatus or heater 22. My heater 22 is, therefore, not to be considered as capable of use only in the particular arrangement shown in Fig. 1.

In Fig. 4, I have shown a modified form of heater wherein a single ram supplies the air to be heated and the air for the burner carburetor. In this figure the air entering the ram 50 divides into two streams. One of these streams flows through the air passage 54 to the inlet of heating pipe 20 and the other air stream flows through the tube 52 located in the furnace 39. The air flowing through the air passage 54 is heated by contact with furnace wall 60 and most of this air enters the inlet end of heating pipe 20.

A small proportion of the air flowing through the air passage 54 is caught by vane 70 and directed into carburetor inlet pipe 72 leading to the carburetor 74 which may be supplied with fuel from any suitable source. This carburetor forms a combustible mixture of fuel and air which flows through pipe 76 to burner tube 34. This mixture then passes through burner tube outlets 36 and is given a whirling motion thereby. This whirling, combustible mixture is ignited by electrical igniter 40 and burns in combustion chamber 38. The hot gases flow from combustion chamber 38 through annular gas passage 46 to outlet 48, through which they are discharged to atmosphere.

Part of the air flowing through tube 52 passes through the perforations 58 in the walls of this tube and mixes with the gases in gas passage 46. The air thus supplied to gas passageway 46 furnishes oxygen to complete the combustion of any unburned fuel therein and prevents stratification of the gases flowing through this passage. If no combustion has taken place in the combustion chamber 38, this inflow of air into the combustible mixture in gas passage 46 dilutes this mixture to such an extent that it is no longer combustible or explosive.

In Fig. 5, I have shown a further modification of my invention wherein all air admitted through a ram 50A flows into a tube 52A extending through a furnace 39A and discharging into the inlet of a heater tube 20A. A part of the air flowing through the tube 52A is deflected by a vane 70A and directed into a carburetor inlet pipe 72A to a carburetor 74A. This carburetor is supplied with fuel from any suitable source and forms a combustible mixture which flows through pipe 76A to burner tube 34 located in combustion chamber 38A of a furnace 39A.

The combustible mixture is delivered to the combustion chamber 38A through openings 36 in burner tube 34 and is ignited by electrical igniter 40. The heated gases of combustion flow through annular gas passage 46A to an exhaust outlet 48A, through which they pass to atmosphere. As the gases pass from the combustion chamber to the outlet 48A, they give up their heat to the walls of tube 52A and this heat is transmitted to the air flowing through this tube and into heating pipe 20A. As in the previous embodiments, the pressure in the tube 52A is maintained slightly greater than the pressure in gas passage 46A and a small portion of the air from the ram 50A passes through perforations 58A and into the gases in gas passage 46A.

The igniters of the modification shown in Figs. 4 and 5 may be provided with the usual thermostatic switches for breaking the circuit to these igniters after the furnaces to which they are attached have attained normal operating temperatures and I have shown each of these modifications as being provided with a reigniter 44 to maintain combustion after the igniters have been cut out. The modifications of Figs. 4 and 5 may be provided with any other usual or suitable controls and in general operate in the same manner as the embodiments shown in Figs. 1 and 2, so that further description of these modifications is unnecessary.

While I have disclosed only three embodiments of my invention, it is to be understood that my invention is capable of numerous other variations and modifications and that my invention is not to be construed as limited to the details shown and described. Instead, my invention is to be construed as covering all variations and modifications coming within the scope of the appended claims.

I claim:

1. In a lightweight airplane heater of the class described, the combination of an unobstructed, smoothly curved tube forming a passage for air to be heated whereby inappreciable resistance is offered to the flow of air therethrough, said tube having an unobstructed inlet end and an outlet end located in different planes, a furnace enclosing said tube and having openings registering with the ends of said tube to permit air flow therethrough, said tube cooperating with said furnace to provide a combustion chamber in one end thereof and an annular passage for hot gases discharged from said combustion chamber, an exhaust outlet adjacent that end of said annular passage remote from said combustion chamber, extending substantially throughout its length, said tube having a multiplicity of fine openings means for supplying a combustible mixture to said combustion chamber and including an air supply ram, and means to provide an air ram for supplying air to said tube, said means and rams being so proportioned as to maintain a greater pressure in said tube than in said combustion chamber and gas passage whereby part of the air entering said tube passes through said openings to dilute and prevent stratification of gases in said gas passage and the remainder of said air is discharged from said tube as heated air free of combustion gases.

2. In a lightweight airplane heater of the class described, the combination of an unobstructed, smoothly curved tube forming a passage for air to be heated whereby inappreciable resistance is offered to the flow of air therethrough, said tube having an unobstructed inlet end and an outlet end located in planes substantially perpendicular to each other, a generally cylindrical furnace enclosing said tube and having openings registering with the ends of said tube to permit air flow therethrough, said tube cooperating with said furnace to provide a combustion chamber in one end thereof and an annular passage for hot gases discharged from said combustion chamber, an exhaust outlet adjacent that end of said annular passage remote from said combustion chamber, said tube having a multiplicity of fine openings extending substantially throughout its length, means for supplying a combustible mixture to said combustion chamber and including an air supply ram, and means to provide an air ram for supplying air to said tube, said means and rams being so proportioned as to maintain a greater pressure in said tube than in said combustion chamber and gas passage whereby part of the air entering said tube passes through said openings to dilute and prevent stratification of gases in said gas passage and the remainder of said air is discharged from said tube as heated air free of combustion gases.

3. In a lightweight airplane heater of the class described, the combination of an unobstructed, smoothly curved tube forming a passage for air to be heated whereby inappreciable resistance is offered to the flow of air therethrough, said tube having an unobstructed inlet end and an outlet end located in planes substantially perpendicular to each other, a generally cylindrical furnace enclosing said tube and having openings registering with the ends of said tube to permit air flow therethrough, said tube cooperating with said furnace to provide a combustion chamber in one end thereof and an annular passage for hot gases discharged from said combustion chamber, an exhaust outlet adjacent that end of said annular passage remote from said combustion chamber, said tube having a multiplicity of fine openings extending substantially throughout its length, said openings being approximately $\frac{1}{16}''$ in diameter, means for supplying a combustible mixture to said combustion chamber and including an air supply ram, and means to provide an air ram for supplying air to said tube, said means and rams being so proportioned as to maintain a greater pressure in said tube than in said combustion chamber and gas passage whereby part of the air entering said tube passes through said openings to dilute and prevent stratification of gases in said gas passage and the remainder of said air is discharged from said tube as heated air free of combustion gases.

4. In a lightweight airplane heater of the class described, the combination of an unobstructed smoothly curved tube forming a passage for air to be heated whereby inappreciable resistance is offered to the flow of air therethrough, said tube having an unobstructed inlet end and an outlet end located in planes substantially perpendicular to each other, a generally cylindrical furnace enclosing said tube and having openings registering with the ends of said tube to permit air flow therethrough, said tube cooperating with said furnace to provide a combustion chamber in one end thereof and an annular passage for hot gases discharged from said combustion chamber, an exhaust outlet adjacent that end of said annular passage remote from said combustion chamber, said tube having a multiplicity of fine openings extending substantially throughout its length, a carburetor for supplying a combustible mixture to said combustion chamber, means to provide an air ram for supplying air to said tube, and means connecting said carburetor with said outlet end so that a greater pressure exists in said tube than in said combustion chamber and gas passage whereby part of the air entering said tube passes through said openings to dilute and prevent stratification of gases in said gas passage and the remainder of said air is discharged from said tube as heated air free of combustion gases.

5. In a lightweight airplane heater of the class described, the combination of an unobstructed smoothly curved tube forming a passage for air to be heated whereby inappreciable resistance is offered to the flow of air therethrough, said tube having an unobstructed inlet end and an outlet end located in planes substantially perpendicular to each other, a generally cylindrical furnace enclosing said tube and having openings registering with the ends of said tube to permit air flow therethrough, said tube cooperating with said furnace to provide a combustion chamber in one end thereof and an annular passage for hot gases discharged from said combustion chamber, an exhaust outlet adjacent that end of said annular passage remote from said combustion chamber, said tube having a multiplicity of fine openings extending substantially throughout its length, means providing a first ram for supplying a combustible mixture to said combustion chamber, means providing a second ram for supplying air to said tube, said means and rams being so proportioned as to maintain a greater pressure in said tube than in said combustion chamber and gas passage whereby part of the air entering said tube passes through said openings to dilute and prevent stratification of gases in said gas passage and the remainder of said air is discharged from said tube as heated air free of combustion gases.

6. In a lightweight airplane heater of the class described, the combination of an unobstructed smoothly curved tube forming a passage for air to be heated whereby inappreciable resistance is offered to the flow of air therethrough, said tube having an unobstructed inlet end and an outlet end located in planes substantially perpendicular to each other, a generally cylindrical furnace enclosing said tube and having openings registering with the ends of said tube to permit air flow therethrough, said tube cooperating with said furnace to provide a combustion chamber in one end thereof and an annular passage for hot gases discharged from said combustion chamber, an exhaust outlet adjacent that end of said annular passage remote from said combustion chamber, said tube having a multiplicity of fine openings extending substantially throughout its length, a second tube surrounding said furnace and forming therewith a second passage for air to be heated, means for supplying a combustible mixture to said combustion chamber and including an air supply ram, and means to provide an air ram for supplying air to said tubes, said means and rams being so proportioned as to maintain a greater pressure in said first tube than in said combustion chamber and gas passage whereby part of the air entering said first tube passes through said openings to dilute and prevent stratification of gases in said gas passage and the remainder of said air is discharged from said tube as heated air free of combustion gases.

7. In a lightweight airplane heater of the class described, the combination of an unobstructed smoothly curved tube forming a passage for air to be heated whereby inappreciable resistance is offered to the flow of air therethrough, said tube having an unobstructed inlet end and an outlet end located in planes substantially perpendicular to each other, a generally cylindrical furnace enclosing said tube and having openings registering with the ends of said tube to permit air flow therethrough, said tube cooperating with said furnace to provide a combustion chamber in one end thereof and an annular passage for hot gases discharged from said combustion chamber, an exhaust outlet adjacent that end of said annular passage remote from said combustion chamber, said tube having a multiplicity of fine openings extending substantially throughout its length, a second tube surrounding said furnace, a carburetor for supplying a combustible mixture to said combustion chamber, means providing a single ram for supplying air to said tubes, and a pipe connecting said carburetor with one of said tubes to maintain a greater pressure in said tubes than in said combustion chamber and gas passage whereby part of the air entering said tubes passes through said openings to dilute and prevent stratification of gases in said gas passage and the remainder of said air is discharged from said tubes as heated air free of combustion gases.

8. In a lightweight airplane heater of the class described, the combination of an unobstructed, smoothly curved tube forming a passage for air to be heated whereby inappreciable resistance is offered to the flow of air therethrough, said tube having an unobstructed inlet end and an outlet end located in different planes, a furnace enclosing said tube and having openings registering with the ends of said tube to permit air flow therethrough, said tube cooperating with said furnace to provide a combustion chamber in one end thereof and an annular passage for hot gases discharged from said combustion chamber, an exhaust outlet adjacent that end of said annular passage remote from said combustion chamber, said tube having a multiplicity of fine openings extending substantially throughout its length, means for supplying a combustible mixture to said combustion chamber, and means to provide an air ram for supplying air to said tube, said mixture supply means and ram being interrelated to maintain a greater pressure in said tube than in said combustion chamber and gas passage whereby part of the air entering said tube passes through said openings to dilute and prevent stratification of gases in said gas passage and the remainder of said air is discharged from said tube as heated air free of combustion gases.

HENRY J. De N. McCOLLUM.